May 29, 1956 J. G. LIVINGSTONE Re. 24,159

CONTAINER ADAPTER PROVIDED WITH POURING SPOUT, DRIP RETURN AND CAP

Original Filed March 9, 1953 2 Sheets-Sheet 1

INVENTOR.

BY JAY G. LIVINGSTONE

Gordon P. Nash

ATTY.

INVENTOR.
JAY G. LIVINGSTONE
BY
Fredon C. Lunck
ATTY.

United States Patent Office

Re. 24,159
Reissued May 29, 1956

24,159

CONTAINER ADAPTER PROVIDED WITH POURING SPOUT, DRIP RETURN AND CAP

Jay G. Livingstone, Akron, Ohio

Original No. 2,715,480, dated August 16, 1955, Serial No. 341,208, March 9, 1953. Application for reissue September 9, 1955, Serial No. 533,535

11 Claims. (Cl. 222—111)

Matter enclosed in heavy brackets [ ] appears in the original patent but forms no part of this reissue specification; matter printed in italics indicates the additions made by reissue.

This invention relates to an adapter for a bottle or other container. It is made of a plastic. The adapter is provided with means for attaching it to the container and with a spout having a pouring lip. There is a channel below the lip which runs down the outer surface of the lip and spout. The bottom of the channel is slit in one or more places so that when downward pressure is applied to the spout it is depressed and the slits open up and provide openings through which liquid which has collected in the channel drains back into the container. The slits may be at the inner edge of the channel adjacent the spout, or at its outer edge near means for attaching the adapter to the container, or at some location in between. The return of liquid to the bottle is preferably accomplished by fastening a cap over the adapter in such a way that it depresses the spout so that the slits open.

The invention will be further described in connection with the accompanying drawings, in which—

Figure 11:
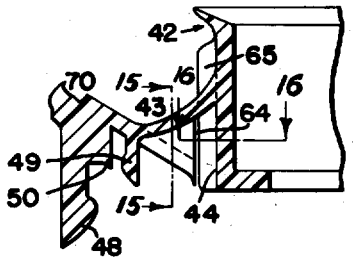
Fig. 11 is a section on the line 11—11 of Fig. 9.
Figure 9:
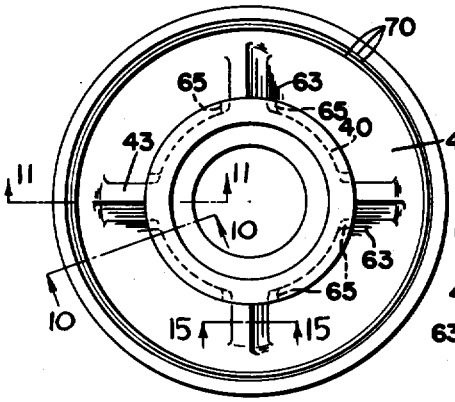
Fig. 9 is a plan view of a modified type of adapter in which the slits are adjacent the outer wall of the spout, the bridges are longer and slope upwardly to the spout, and the spout is thin where the bridges are attached to make its walls more flexible.
Figure 15:
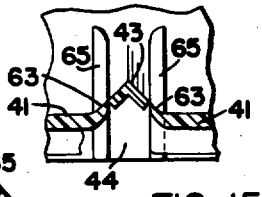
Figure 16:
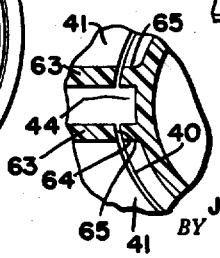

Fig. 15 is a section, partly broken away, on the line 15—15 of Figs. 9 and 11; and Fig. 16 is a section on the line 16—16 of Fig. 11.

The adapter shown in the drawings is provided with a skirt portion 1 which fits over the top of a bottle or other container. It is to be understood that instead of being provided with a skirt portion the base of the adapter may be in the form of a stopper which fits into the neck of a bottle or the like, or the base may be threaded internally or externally to screw on to the neck of a bottle, or the base of the adapter may be of any other design.

Located centrally of the adapter is the spout 2 with the pouring lip 3 at the top thereof. This lip extends around the top of the spout so that liquid can be poured from it when the bottle or container is tilted in any direction.

The spout 2 is supported from the skirt 1 by the bridges 6. As clearly shown in Fig. 5, these bridges 6 are located below the outer wall 7 above the skirt 1. This wall forms a tight seal with the cap by means of a groove in the undersurface thereof, as will be explained in what follows.

Figures 4, 5, 6, 7:
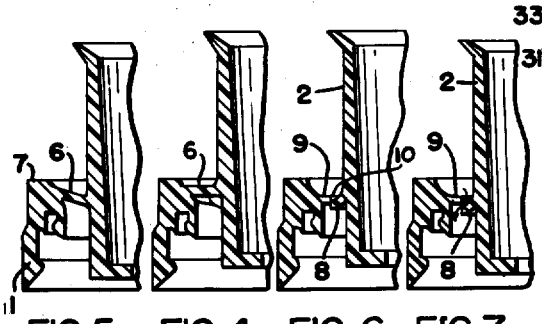
Fig. 4 is a section through a bridge portion of the adapter between slits on the line 4—4 of Fig. 1.
Fig. 5 is a similar section but with the spout depressed.
Fig. 6 is a section through a slit portion of the adapter on the line 6—6 of Fig. 1.
Fig. 7 is a similar section but with the slits open.

Between the bridges 6 are the slit depressed areas, one portion 8 of which is attached to the spout, and another portion 9 of which is attached to the skirt. Between these portions are the slits 10. As best shown in Fig. 6, the portion 8 is preferably offset downwardly somewhat from the portion 9, although the portions 8 and 9 contact one another so that when the conainer is tipped for pouring no liquid escapes between the two. These portions, or at least the lower of them, are preferably curved downwardly so that the pressure of liquid against their undersurface when the container is tilted forms a seal between them so that no liquid escapes.

When pressure is applied to the top of the spout, as when a cap is fastened down over it and the spout is pressed downwardly with respect to the skirt (as illustrated in Figs. 2, 5, 7 and 8), the portions 8 of the channel are offset downwardly from the portions 9, opening the slits 10, and any liquid which is collected in the channel drains down through the slits into the bottle. The portions 8 and 9 are maintained in this offset position as long as pressure is applied to the top of the spout. Thus, if the bottle is upset with the cap fastened over the spout, liquid may run out through the slits between these offset portions but it will be retained under the cap and will not spill out of the cap enclosure. When the bottle is righted prior to removing the cap any liquid which has thus escaped from the bottle into the cap will be returned through the slits to the bottle. When the pressure on the spout is released by removal of the cap, the portions 8 return into sealing engagement with the portions 9.

Figure 1:
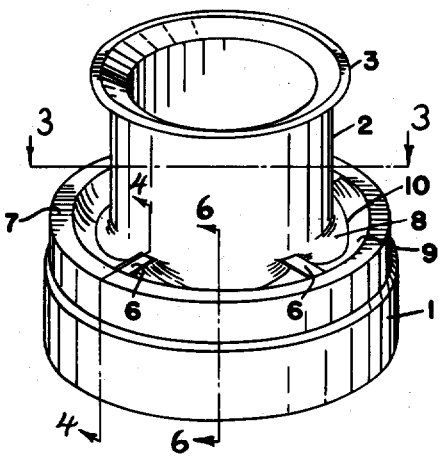
Fig. 1 is a view in perspective of the adapter.
Figure 2:
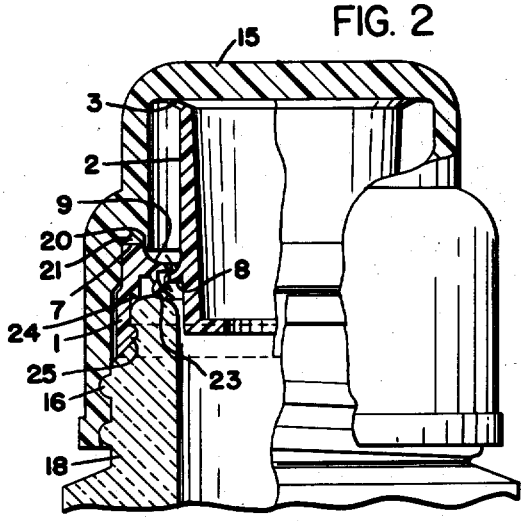
Fig. 2 shows the adapter on a bottle with a cap fastened to the bottle over the adapter which presses the spout down into the bottle sufficiently to open the slits located in the channel which surrounds the spout.
Figure 3:
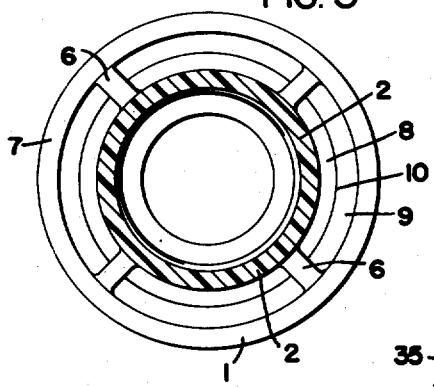
Fig. 3 is a plan view of the adapter on the line 3—3 of Fig. 1.

Figure 2 shows the cap 15 screwed onto the threads 16 on the outside of the neck 18 of a bottle. The threads cover a sufficient vertical area on the outer surface of the bottle so that when the cap is screwed down on these threads the top of the cap depresses the spout sufficiently to open the slits 10 between the portions 8 and 9 of the channel. Figure 2 shows the spout depressed and the slits open.

The cap is of the type in which there is an annular tongue 20 which projects downwardly from its inner surface. The outer wall of this tongue is beveled inwardly and downwardly and meets the downwardly and outwardly slanting wall of the cap to form the V-shaped groove 21 which fits over the top of the wall 7 of the adapter. The adapter is made of flexible plastic and the top of the wall 7 is squeezed by this V-shaped groove 21 so that there is a liquid-tight seal formed all around the top of the adapter. This prevents leakage from the cap enclosure when the capped bottle is upset.

On the undersurface of the portion 9 of the channel around the spout is the flexible tongue 23 which is pressed against the top edge of the neck of the bottle and makes a liquid-tight seal with it. There is also the annular pointed tongue 24 of somewhat larger diameter which makes a further seal with this top edge of the bottle. The adapter shown is of the slip-on type in which the bead 25 fits into a complementary indentation around the top of the bottle. Between the tongues 23 and 24 is a tightly sealed air pocket in which air is trapped at a pressure greater than atmospheric, and this prevents liquid escaping from the bottle when the bottle is tilted.

The bottle fitted with this adapter and cap is liquid tight. It can be tipped over and although the liquid may then run into the cap through the slits 10, as soon as the bottle is returned to the upright position all of this liquid drains back into the bottle.

As soon as the cap is removed from the bottle the depressed spout assumes its original position. This closes the slits 10 and prevents any liquid from escaping through the slits when the bottle is tipped for pouring. After pouring any liquid dripping from the lip 3 or running down the outside of the spout collects in the channel. It can be drained into the bottle by manually depressing the spout to open the slits 10. Whenever the cap is replaced any liquid in the channel is automatically returned to the bottle.

Figure 8:
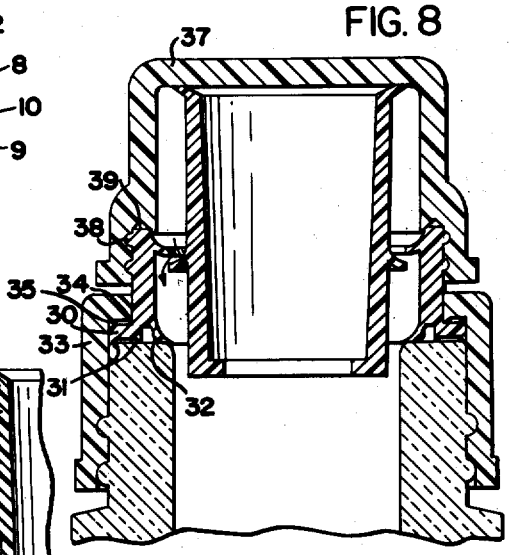
Fig. 8 is a view of a slightly modified form of adapter fastened to a bottle with a cap with an open top and covered by a second cap which is fastened to the adapter and depresses the spout thereof so as to open the slits therein.

Figure 8 illustrates a modified type of adapter. The bridges, channel and slits are identical with those previously described. The adapter is of flexible plastic. The flange 30 which extends outwardly from its base is designed with two annular contact points 31 on its undersurface. These and the tongue 32 form an air pocket similar to that formed by the tongues 23 and 24 of Fig. 2 and form a tight seal.

When the hard cap 33 is screwed on to the bottle it presses down on the flange 30 and holds the adapter tightly to the top of the bottle. The annular tongue 34 on the cap 33 presses down on the top of the flange between the contact points 31 and seals these tightly against the top of the bottle. This is aided by the upwardly projecting outer edge 35 of the flange 30 which presses against the undersurface of the cap 33 and forces the tongue 31 on the outer edge of the flange 30 against the top edge of the bottle.

The cap 37 may be of hard plastic or flexible plastic. It is threaded onto the external threads 38 of the adapter. The V-shaped groove 39 in the undersurface of the cap operates in the same manner as the groove 21 of the cap 15 of Fig. 2, making a tight seal with the top of the wall of the adapter.

Figure 12:
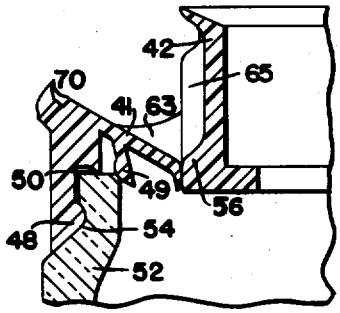
Fig. 12 is a section similar to the section of Fig. 10, but with the adapter on a bottle.

In the adapter shown in Figs. 9–16 the slits 40 are at the inner edge of the channel 41 adjacent the spout 42. The bridges 43 are long and extend upwardly. The spout is thin above the bridges, and it is grooved at 44 below the bridges, making it thin and flexible where the bridges are attached to it. The bridges are preferably of uniform thickness, as shown in Fig. 15, so that they flex readily. The undersurface of the skirt 47 of the adapter is provided with a bead 48 at its bottom edge, a flexible annular tongue 49 and an annular pointed bead or tongue 50. Figure 12 shows how these cooperate with the bottle 52 in order to form a tight seal. The bead 48 fits snugly into the groove 54 in the bottle. The tongue 49 presses against the inner edge of the top of the neck of the bottle and this throws the inner edges of the channel 41 up to make tight contact with the portions 56 of the base of the spout which bulge out between the bridges. The bead or tongue 50 presses against the top surface of the bottle. The tongue 49 is flexible and makes a tight seal with the inner edge of the top of the bottle even though the thickness of the neck of the bottle varies. The beads 50 and 48 are so spaced as to make a tight fit between the top and the outer surface of the neck of the bottle.

Figure 10:
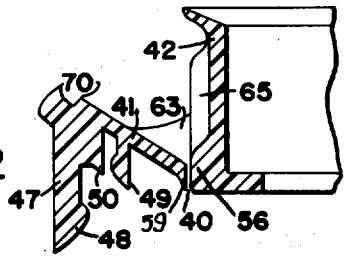
Fig. 10 is a section on the line 10—10 of Fig. 9.

Figure 10 shows that when the adapter is not on a bottle there is a slight opening at the slit 40. When the adapter is placed on a bottle, as in Fig. 12, the tongue 49 is pressed inwardly and this closes the slit 40 by pressing the inner edges of the channels 41 against the outer surfaces of the portions 56 of the spout 42.

Figure 13:
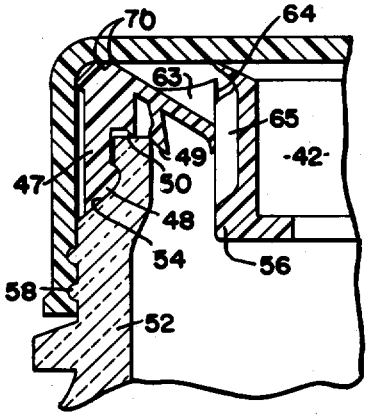
Fig. 13 is a section similar to those shown in Figs. 10 and 12, but with a cap on the bottle and the spout of the adapter depressed, opening the slits.
Figure 14:
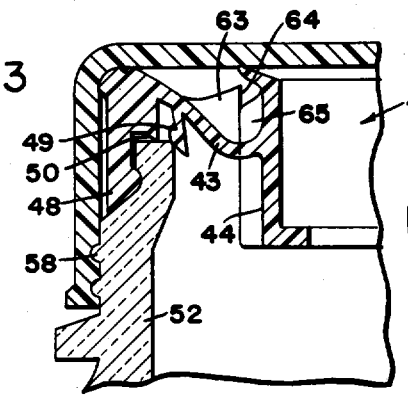
Fig. 14 is a section similar to that shown in Fig. 13 but on the same line as the section of Fig. 11.

Figures 13 and 14 illustrate how the spout is depressed and the slits 40 are opened up when the cap 57 is screwed onto the threads 58 of the bottle 52. The cap is shallow and applies pressure uniformly around the lip of the spout. The inner edge of each channel is provided with a tongue 59. The tip of each tongue is curved outwardly to guide the inner edge of the channel over the protruding base portion 56 of the spout between the bridges when the spout rises as the cap is removed. Thus, when the cap is removed the adapter returns to the position illustrated in Fig. 12.

The bridges must be higher than the channel in order to permit liquid which drops on their upper surface to drain over their sides, down into the channel. By providing long, sloping bridges it is possible to depress the spout to a greater extent than is possible with the design of adapter shown in Figs. 1–7. The long bridges 43 of the adapter of Figs. 9–14 permit the spout to be depressed sufficiently to permit drainage of liquid from the channel into the bottle before the threads on the cap make contact with the threads 58 on the bottle.

There is a wall 63 at each edge of each channel portion 41, adjacent the bridges. Figs. 10 and 11 illustrate the adapter, as molded, and there is a slight space between the edge 64 of each wall 63 and the ribs 65 on the spout on each side of each bridge. When the adapter is put on a bottle, as in Fig. 12, the channel is lifted sufficiently to close this space. When the bottle contains liquid and is tilted for pouring, these walls prevent the liquid from running out from between the bridges and the channels. When the spout is depressed, the edges 64 slide up on the ribs 65, as illustrated in Figs. 13 and 14, and the spaces between the inner edges of the channels and the bulged portions 56 at the base of the spout open and permit any liquid on the channels to drain into the container.

The edges of the bridges come to a point, as best illustrated in Fig. 15. They make line-contact with the outer surfaces of the walls 63 and form a liquid-tight seal which prevents the escape of liquid from within the bottle, when the bottle is tilted for pouring. When the spout is raised, the top of each wall 63 contacts the edge of the adjacent bridge, as shown in Fig. 15. The bridges slope to each side so that any liquid on them, whether because of dripping from the lip or for any other reason, drains over the top of the adjacent wall 63 when the spout is raised, and down into the channel. Then, when the spout is depressed, this liquid runs over the inner edge of the channel, into the container.

The top of the outer edge of the adapter is provided with the beads 70 which press against the inner surface of the cap when the cap is screwed down tight, and prevent any leakage of liquid from the bottle to the outer surface of the adapter beyond the channel. When the cap is screwed down tight the slits 40 are open and if the bottle is then upset liquid drains through these slits against the inner surface of the top of the cap. The beads 70 prevent its going beyond this. The several beads 70 at different locations insure sealing contact between the adapter and caps of different design.

It is often desirable to assemble the adapters in the caps at a bottling works, or before shipment to the bottling works, so that after the bottles are filled the only operation required to close them is to screw the caps on to them. The tight fit of the beads 70 in the caps serves to hold the adapters in the caps before applying them to the bottles. This subassembly can be made at any convenient time and place. After the bottles are filled, it is only necessary to screw the caps in place. In doing this the beads 48 on the adapters automatically slip into place in the grooves 54, and no additional operation is necessary to fit the adapters on the bottles.

The drawings illustrate how the invention is applicable to adapters of different designs with different types of caps. The construction of the channel and slits may be varied to suit requirements. The adapter shown is designed to be molded of polyethylene or the like, the shrinkage of which during molding is dependent on the thickness of different parts of the molded product. Thus, by making the top of the outer wall of the adapter shown in Figs. 9–16 of greater material thickness than the portions of the adapter within this wall, these portions within the wall are brought together as the portion of greater material thickness shrinks and the inner edge of each tongue 59 is drawn inwardly into contact with the base of the spout. This narrows or eliminates the space 40 (Fig. 10) between each tongue and the spout occupied by the mold during the molding. It also draws the outer surface of each wall 63 closer to the edge of the bridge adjacent to it. Thus by providing a bulk of the plastic around the edge of the adapter, edges which are separated by the thickness of the mold during molding are brought closer to one another.

It is possible to form the spout and the surrounding portion of thte adapter as separate units of thermosetting material, with the slit located between them. The adjoining edges of the two units may be formed by interlocking fingers. The two units may be united by a spring of metal or the like which will force the spout upwardly when there is no downward pressure on it, and bring the interlocking fingers into sealing contact between the units.

The invention is defined to claims which follow.

What I claim is:

1. An adapter of flexible plastic for a container, the adapter being provided with a spout for pouring liquid therethrough, a wall around the spout, a channel between said wall and the spout for the collection of liquid dripping from the spout and liquid running down the outer wall of the spout, and a slit in the channel dividing at least a part of the channel into one part that adheres to the spout and another part that adheres to the wall, whereby when the spout is depressed with respect to said wall the slit is opened and liquid in the channel drains therethrough.

2. The adapter of claim 1 in which the highest point of the spout is higher than the wall.

3. The adapter of claim 1 in which the pouring lip extends around the top of the spout and the channel is provided with a plurality of slits arranged substantially uniformly around the spout.

4. The adapter of claim 1 in combination with a cap which covers the spout and the lower portion of which is releasably sealed to the outer surface of said wall with its undersurface contacting the top of the spout and depressing the same with respect to the wall, whereby the slit is opened.

5. The adapter of claim 1 in combination with (1) a container and affixed to an opening therein and (2) a cap which covers the spout with the lower portion thereof releasably sealed to the outer surface of the container and with its undersurface contacting the top of the spout and depressing the same with respect to the wall whereby the slit is opened.

6. An adapter of flexible plastic for a container, which adapter includes a cylindrical spout with a pouring lip extending completely around the top thereof, means at the bottom of the adapter for attaching the adapter to a container, flexible bridges between the spout and the attaching means and a channel extending between each two bridges and extending from the spout to the attaching means, and a slit in each channel extending substantially from one bridge to the next and which is opened when the spout is depressed with respect to the attaching means.

*7. A flexible adapter for a container adapted to hold liquid which comprises a spout adapted for delivery of liquid from the c. ntainer, means surrounding the spout attaching the spout to the container, drainage means in said attaching means which is capable of being opened and closed, the adapter at the drainage means being adapted to be distorted by depression of the spout with respect to the perimeter of the attaching means, the drainage means being closed with the spout is not depressed and open when it is depressed.*

*8. In combination, a container having a neck with an opening therein, the adapter of claim 7 attached to the container at the opening, a cap fastened to the neck and covering the opening in the neck and also depressing the spout of the adapter whereby the drainage means is opened.*

*9. In combination, a container having a neck with an opening therein, the adapter of claim 7 attached to the container at the opening, a cap screwed on to the neck and covering the opening in the neck and also depressing the spout of the adapter whereby the drainage means is opened, the spout being adapted to return to its undepressed position when the cap is removed, the drainage means being closed when the spout is in said undepressed position.*

*10. An adapter for a container adapted to hold liquid, which adapter includes (1) a spout adapted for the pouring of liquid therethrough, (2) means for the attachment of the adapter to the vessel, (3) supporting means between the spout and the attachment means which holds the spout depressably extended, and (4) a liquid-collecting area between the spout and the attachment means in which area is drainage means openable by movement of the spout in one direction with respect to the attachment means and closable by movement of the spout in the reverse direction.*

*11. An adapter for a container adapted to hold liquid, which adapter includes (1) a spout adapted for the pouring of liquid therethrough, (2) means for the attachment of the adapter to the vessel, (3) supporting means between the spout and the attachment means which holds the spout depressably extended, and (4) a liquid-collecting area between the spout and the attachment means in which area is drainage means openable by depression of the spout and closable by return of the spout to said depressably extended position.*

References Cited in the file of this patent or the original patent

UNITED STATES PATENTS

| | | |
|---|---|---|
| 174,840 | Newton | Mar. 14, 1876 |
| 1,306,263 | Lang et al. | June 10, 1919 |
| 2,459,215 | Blake et al. | Jan. 18, 1949 |
| 2,573,378 | Zurlindin | Oct. 30, 1951 |